(12) United States Patent
Regensburger et al.

(10) Patent No.: US 11,143,857 B2
(45) Date of Patent: Oct. 12, 2021

(54) MICROSCOPE AND MICROSCOPY METHOD FOR IMAGING AN OBJECT INVOLVING CHANGING SIZE OF DEPTH-OF-FIELD REGION

(71) Applicant: Carl Zeiss Meditec AG, Jena (DE)

(72) Inventors: Alois Regensburger, Poxdorf (DE); Artur Hoegele, Oberkochen (DE); Christoph Hauger, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 354 days.

(21) Appl. No.: 16/402,209

(22) Filed: May 2, 2019

(65) Prior Publication Data

US 2019/0339502 A1    Nov. 7, 2019

(30) Foreign Application Priority Data

May 3, 2018    (DE) ..................... 10 2018 110 641.6

(51) Int. Cl.
*G02B 21/02*    (2006.01)
*G02B 21/22*    (2006.01)
(Continued)

(52) U.S. Cl.
CPC ........... *G02B 21/22* (2013.01); *G02B 21/025* (2013.01); *G02B 21/365* (2013.01); *G06T 7/593* (2017.01);
(Continued)

(58) Field of Classification Search
CPC .. G02B 21/0012; G02B 21/025; G02B 21/22; G02B 21/365; G02B 21/367;
(Continued)

(56) References Cited

U.S. PATENT DOCUMENTS

2005/0168809 A1    8/2005    Moller et al.
2007/0047073 A1    3/2007    Zimmer et al.
(Continued)

FOREIGN PATENT DOCUMENTS

DE    102004006066 A1    8/2005
DE    102006036300 B4    11/2007
(Continued)

OTHER PUBLICATIONS

D. Goeggel et al, "FusionOptics Combines high resolution and depth of field for ideal 3D optical Images" Apr. 18, 2008, last access at https://www.leica-microsystems.com/science-lab/fusionoptics-combines-high-resolution-and-depth-of-field-for-ideal-3d-optical-images/ on May 2, 2019.

*Primary Examiner* — Ryan S Dunning
(74) *Attorney, Agent, or Firm* — Falk Ewers; Ewers IP Law PLLC

(57) ABSTRACT

A microscopy method for imaging an object includes: imaging the object into an optical image onto an image detector, generating electronic image data from the optical image using the image detector and generating an electronic image from the electronic image data, defining a region of interest in the electronic image, determining a depth distribution in the region of interest and/or in a region of the object corresponding to the region of interest, determining a desired depth region in the depth distribution, selecting at least one imaging parameter with which a size of a depth-of-field region can be changed, and setting the depth-of-field region of the electronic image by changing the at least one selected imaging parameter such that the depth-of-field region covers the desired depth region or covers a specific portion thereof.

13 Claims, 4 Drawing Sheets

(51) Int. Cl.
*G02B 21/36* (2006.01)
*G06T 7/593* (2017.01)
*G02B 21/00* (2006.01)

(52) U.S. Cl.
CPC ........ *G02B 21/0012* (2013.01); *G02B 21/367* (2013.01)

(58) Field of Classification Search
CPC ......... G06T 7/521; G06T 7/571; G06T 7/596; G06T 2207/10056; G06T 2207/10061
See application file for complete search history.

(56) References Cited

U.S. PATENT DOCUMENTS

| | | |
|---|---|---|
| 2011/0279651 A1 | 11/2011 | Hong et al. |
| 2012/0002084 A1 | 1/2012 | Weissman et al. |
| 2012/0063669 A1 | 3/2012 | Hong et al. |
| 2013/0016187 A1 | 1/2013 | Zhang et al. |

FOREIGN PATENT DOCUMENTS

| | | |
|---|---|---|
| DE | 102008037074 A1 | 2/2010 |
| DE | 102008041290 A1 | 2/2010 |
| DE | 202013011877 U1 | 10/2014 |
| DE | 102014102080 A1 | 8/2015 |
| DE | 102014210121 A1 | 8/2015 |
| DE | 102015216573 A1 | 9/2016 |
| DE | 102016117263 A1 | 3/2018 |
| WO | 2010017943 A1 | 2/2010 |

MICROSCOPE AND MICROSCOPY METHOD FOR IMAGING AN OBJECT INVOLVING CHANGING SIZE OF DEPTH-OF-FIELD REGION

CROSS REFERENCE TO RELATED APPLICATIONS

This application claims priority to German patent application DE 10 2018 110 641.6, filed May 3, 2018, the entire content of which is incorporated herein by reference.

TECHNICAL FIELD

The disclosure relates to a microscopy method for imaging an object and to a microscope for generating an electronic image of an object.

BACKGROUND

To capture an image of an object, a plurality of imaging parameters in microscopes must be configured to capture a sharp image with high contrast and high resolution. One parameter is the depth-of-field region of an image. The greater the magnification of the microscope is, the smaller becomes the depth-of-field region, that is to say the region around the focal plane of the microscope in which the object is imaged sharply. If a stop is present in the imaging beam path, the depth-of-field region can be increased by stopping down, but at the expense of the brightness of the image.

WO 2010/017943 A1 describes to select the stop diameter in a stereo microscope in two different subchannels. This produces partial images of the stereo image with different depth-of-field regions which impress upon an observer a depth-of-field region that is determined by the larger depth-of-field region of the two partial images.

SUMMARY

It is the object of the disclosure to provide a microscopy system to optimally set a depth-of-field region of an image.

A microscopy method for imaging an object includes imaging the object into an optical image on an image detector, generating electronic image data from the optical image with the image detector, generating an electronic image from the electronic image data, and defining a region of interest in the electronic image.

A microscope for capturing an electronic image of an object includes imaging optics, an image detector, and a control device having an input device, wherein the imaging optics images the object into an optical image on the image detector, wherein the image detector generates electronic image data from the optical image and the control device generates an electronic image of the object from the electronic image data, and wherein the control device is configured to permit selection of a region of interest in the electronic image with the input device.

In the microscopy method, an object is imaged onto an image detector, and an electronic image of the object is thus captured. A region of interest is selected and defined in the image. A depth distribution is ascertained for this region of interest or for a region of the object that corresponds to said region of interest. A depth region of interest is defined within the depth distribution. Next, at least one imaging parameter that influences the size of the depth-of-field region is selected. The selected imaging parameter is changed such that the depth-of-field region is set, with respect to its size (and optionally also its axial position), such that it coincides with the desired depth of field or at least contains it.

The microscopy method can be performed using a microscope, in particular a stereo microscope. The microscope is typically a surgical microscope, which magnifies and presents an object, typically stereoscopically. To this end, the microscope has a display device, for example two screens or displays which are located at a distance from one another, such that an observer can stereoscopically perceive the object using the display device. The microscope is typically a purely digital microscope, that is to say the object can be observed only using the display device and not using an eyepiece. However, it is also possible for the microscope to allow observation of the object using an eyepiece, or that the combination of eyepiece and display device is present.

The object is specifically a sample or a body that is to be observed using the stereo microscope, for example a human being or a body part of a human being or of an animal.

The image detector generates image data for an electronic image of the object from the optical image. To this end, it has for example a plurality of pixels that convert incident radiation into electrical signals. The incident radiation can be for example light in the visible range and/or radiation in the ultraviolet wavelength range and/or in the infrared wavelength range. The image detector can include, for example, a complementary metal-oxide-semiconductor (CMOS) sensor or a charge-coupled device (CCD) sensor. The control device can be for example a microprocessor, a computer having a correspondingly configured computer program, or another electric circuit. The control device generates the electronic image from the image data.

The microscope has an input device which can be used to operate the control device. In particular, it can be used to specify a magnification scale and/or a minimum resolution and/or image brightness. The input device is furthermore used to select the region of interest and the depth region. The input device can be a keypad or another operating element and is connected to the control device.

Variable imaging parameters which can be used to change the depth of field of the imaging can be, for example, the magnification scale, a focal length, an aperture size of a stop provided in the imaging beam path, or a working distance between the microscope and the object. The imaging parameter influences the depth of field of the imaging. The depth-of-field region is the axial region around the focal plane that is presented sharply. The selection can be made by the control device automatically according to prescribed rules or specifications and/or via the input device.

In the image, a region of interest is selected, which for example coincides with a section of the object that is of interest. The image is to be sharp within this region of interest. The region of interest can be a section of the image, but can also correspond to the entire image. For this step, it is possible according to exemplary embodiments for a temporary image of the object to be produced, in which the selection is made, using temporarily set imaging parameters.

The existing depth distribution of the object is determined in the region of interest. The depth distribution characterizes the axial extent, in particular measured perpendicularly to the focal plane. The region of interest is a two-dimensional section in the image, while the desired depth region is perpendicular to the region of interest. Viewing an axially extending channel, for example, produces a depth distribution spanning from the end to the beginning of the channel or between. The region of interest in this case can be set to the end or the beginning of the channel.

According to an aspect of the disclosure, the depth distribution is measured by way of a measuring step using the microscope or is calculated from a temporary image. Alternatively, the depth distribution can be measured using a separate sensor at the object (for example using a time-of-flight sensor), wherein the section in which the depth distribution is determined corresponds to the region of interest.

According to another aspect of the disclosure, the depth distribution is a previously known depth map of the object or statistic indicating the relative frequency of a specific height of the object within the region of interest. A desired depth region is selected in the depth distribution either manually or automatically by way of the control device, which for example derives from the region of interest which depth region is assigned to the region of interest and selects the desired depth region such that it covers the depth region, which is assigned to the region of interest, as completely as possible or to a settable percentage. The desired depth region is thus part of the depth distribution of the object or completely covers it.

The desired depth region can be defined manually or automatically. According to an aspect of the disclosure, a user of the microscope enters the desired depth region at the input device. Alternatively, the control device can be embodied to automatically recognize specific objects or structures in the image and to define the region of interest and/or the desired depth region in a manner such that it is adapted thereto. The microscope can optionally include a capturing device which captures the viewing direction of the observer of the image and thus recognizes the region of the image in which the observer primarily aims his or her gaze. The region of interest is then ascertained therefrom.

At least one imaging parameter, the variation of which influences the size of the depth-of-field region, is then selected, typically automatically, and varied such that the depth-of-field region (at least partially) covers the desired depth region or coincides therewith. This can be done iteratively. The method can be terminated if it is not possible to achieve the required degree of overlap by way of changing the imaging parameter. This can be the case for example if the desired depth region is of a size such that in the case of a set minimum magnification scale of the microscope is not possible.

Determining the depth distribution makes the adaptation of the depth-of-field region easier, because it is known from the depth distribution or the desired depth region in which range of values the depth-of-field region should lie. By determining the depth distribution and the desired depth region that is derived from the region of interest, the microscopy method is typically completely automated.

According to an aspect of the disclosure, a pair of imaging parameters is used, of which a first parameter changes the size of the depth-of-field region and a further image property, and a second parameter compensates this change of the further image property but not the change in the depth-of-field region. Various examples exist for such parameter pairs. A first example is the setting of a stop, which influences the depth-of-field region by stopping down or stopping up, and the light intensity, which is used to produce the optical or electronic image, as a compensating second parameter. A second example is the magnification scale in the case of the optical imaging for setting the depth-of-field region and the working distance of the microscope for compensating the image field size change that is associated with the change in the magnification scale. A third example is the change in the optical imaging scale for setting the depth-of-field region and digital post-enlargement in the electronic image. The counteracting influencing by the imaging parameter pair can also optionally be effected in a stereo microscope only in one of the two subchannels, that is to say in the left or right image, but not in the other. Any deterioration in image quality due to the counteracting setting of the parameter pair thus becomes effective only in this one subchannel and disturbs the stereo image less than if it had been used in both subchannels.

According to an aspect of the disclosure, the object is imaged onto the image detector using a zoom optical unit with adjustable magnification scale, and the selected imaging parameter is the magnification scale. The magnification scale is typically reduced by a zoom factor, the image is captured at the reduced magnification scale, and then digitally post-enlarged with the zoom factor. The zoom optical unit includes for example an objective or lens system. The zoom optical unit can be embodied to adjust the magnification scale continuously or incrementally. For example, the magnification scale of the zoom optical unit can be adjusted by moving the lenses towards one another, such as for example in zoomable objectives, or by inserting or removing lenses into or out of the imaging beam path. To this end, a drive for adjusting the lenses can be provided, which is controllable by the control device and is connected thereto by way of a data link. By reducing the magnification scale, the depth-of-field region of the image is increased. The subsequent, compensating digital post-enlargement does not reduce the depth-of-field region again. Since the reduction in the magnification scale and the compensating digital post-enlargement do not produce a change in the section of the object presented in the image, the observer sees the object with an increased depth-of-field region. In this way, the depth-of-field region of the image can be adapted to the desired depth region without resulting in changes in the presented section of the object. However, the resolution of the image is reduced due to the reduction of the magnification scale, because the digital post-enlargement does not further improve the resolution of the image. For this reason, the reduction in the magnification scale is typically only performed to the extent that a minimum resolution in the image continues to be provided. This minimum resolution can be set by the observer at the microscope. The intention here is in particular to prevent a situation in which, by setting the depth-of-field region, the resolution of the image is reduced such that structures in the object can no longer be resolved, resulting in an undesirable deterioration of the image.

According to an aspect of the disclosure, the object is imaged via a stop having a variable aperture size, wherein the selected imaging parameter is the aperture size and the aperture size is reduced for setting the depth-of-field region. The stop can be part of a zoom optical unit, for example. The stop is provided with a drive, which can be used to incrementally or continuously change the aperture size. The drive is connected to the control device such that the control device is able to adjust the aperture size. The depth-of-field region increases due to stepping down, that is to say by reducing the aperture size, while at the same time the image brightness decreases. By changing the aperture size with regard to the depth distribution, it is ensured that the depth-of-field region of the image is optimally set. It is typical for the stopping down to increase at the same time a quantity of light during the production of the optical and/or electronic image, for example an illumination intensity can be increased. It is also possible for the control device to actuate the image detector such that it increases its exposure time. This can be accomplished, inter alia, by increasing the time interval between two image recording cycles. The exposure time can additionally be changed by way of a shutter and/or by way of the time interval of the integration in which the image detector is exposed to the incident radiation before it is read. A further possibility is pixel binning. The image brightness decreases due to a reduction in the aperture size, with the result that the signal-to-noise ratio is reduced owing to the decrease in aperture size. This disadvantage can be balanced out by an increase in the amount of light. In particular, the illumination intensity and/or exposure time is increased when the signal-to-noise ratio falls under a limit value due to the reduction in aperture size. This limit value can be manually input by the viewer of the image or is stored in the microscope, in particular in the control device. For example, the limit value of the signal-to-noise ratio can be a value at which it is expected that the image makes an acceptable signal-to-noise ratio with a given magnification scale and aperture size possible.

Alternatively or additionally, the improvement in the signal-to-noise ratio with a simultaneous reduction in the aperture size can also be achieved by reducing the optional magnification scale, as described above, with simultaneous digital post-enlargement. Due to the reduction in the magnification scale, the radiation coming from a specific section of the object is incident on a smaller region of the image detector, thus increasing the intensity of the radiation per unit area. In particular, the intensity per illuminated pixel increases, which means that an increased light intensity is generated in the detection device, as a result of which the signal-to-noise ratio is improved. Digital post-enlargement does not change the signal-to-noise ratio, which means that both the signal-to-noise ratio and the depth-of-field region are optimized.

According to an aspect of the disclosure, a focal length of the imaging is adjustable, and the depth-of-field region is centered to the desired depth region by changing the focal length. The focal length of the zoom optical unit defines the working distance between microscope and the object. The focal length does not change the size of the depth-of-field region, but does move the depth-of-field region. Specifically, axial centering onto the desired depth region is performed. With this measure, it is also possible for the depth-of-field region to be adapted to the depth distribution without changing the size thereof. Since the depth distribution is determined, this adaptation can be effected automatically. The change in focal length can be performed iteratively or by way of a specified routine.

It is typical for the depth distribution in the object to be measured using a separate sensor, for example a time-of-flight sensor. The sensor is connected to the control device. A time-of-flight sensor determines the height levels in the object on the basis of time-of-flight differences and in this way captures the depth distribution. The time-of-flight sensor can be adjunctive to the image detector in the microscope, for example, which means that, for example, the time-of-flight sensor and the image detector use the same zoom optical unit. Alternatively it is possible that the depth distribution of the object is already known in advance and that this already known information is used to determine the depth distribution.

It is typical that a stereoscopic image of the object consisting of two partial images is generated. In particular, the microscope, in which the microscopy method is used, is a stereo microscope capturing the two partial images. In particular, the image detector includes two cameras which are spaced apart in the imaging plane transversely to the optical main axis and capture the partial images with the same section of the object from different viewing angles.

It is typical that the above-described method is applied for only one partial image of the stereo image. For example, the zoom optical unit includes a camera objective for each of the two cameras. The change in magnification scale is then effected optionally on only one of the two camera objectives, with the result that the two camera objectives have different magnification scales. The quotient of the magnification scales defines a zoom factor with which the partial image, which was captured at the smaller magnification scale, is digitally post-enlarged. In this way, the electronic partial images have the same magnification of the object. If these two partial images are stereoscopically presented to the observer, said observer sees a stereo image of the object with the improved depth-of-field region of the image with the lower optical magnification scale and the improved resolution of the image with the larger optical magnification scale. In this way, an improvement of the depth-of-field region without changing the resolution or the signal-to-noise ratio is simultaneously achieved. However, it is also possible that the method is used for both stereo channels of the stereo microscope. In that case, it is typical that the depth distribution is calculated from the partial images of the stereo image, for example by determining a displacement, caused by the parallax, between the two partial images of the stereo image. The deviation of the displacement of a structure in the two partial images can be used to determine a depth distribution of the object. Methods for determining a depth distribution from a stereo image are known in the prior art and can be used.

According to an aspect of the disclosure, the microscope includes a capturing device. The latter captures the location on the display device of the microscope at which the observer aims his or her gaze. The control device ascertains the region of interest in the image on the basis of said location.

With regard to the considerations made in connection with the microscopy method, exemplary embodiments and advantages apply analogously to the microscope.

BRIEF DESCRIPTION OF THE DRAWINGS

The disclosure will now be described with reference to the drawings wherein.

DESCRIPTION OF EXEMPLARY EMBODIMENTS

The aforementioned features and those yet to be explained below can be used not only in the combinations specified but also in other combinations or on their own, without departing from the scope of the present disclosure.

Figure 1:
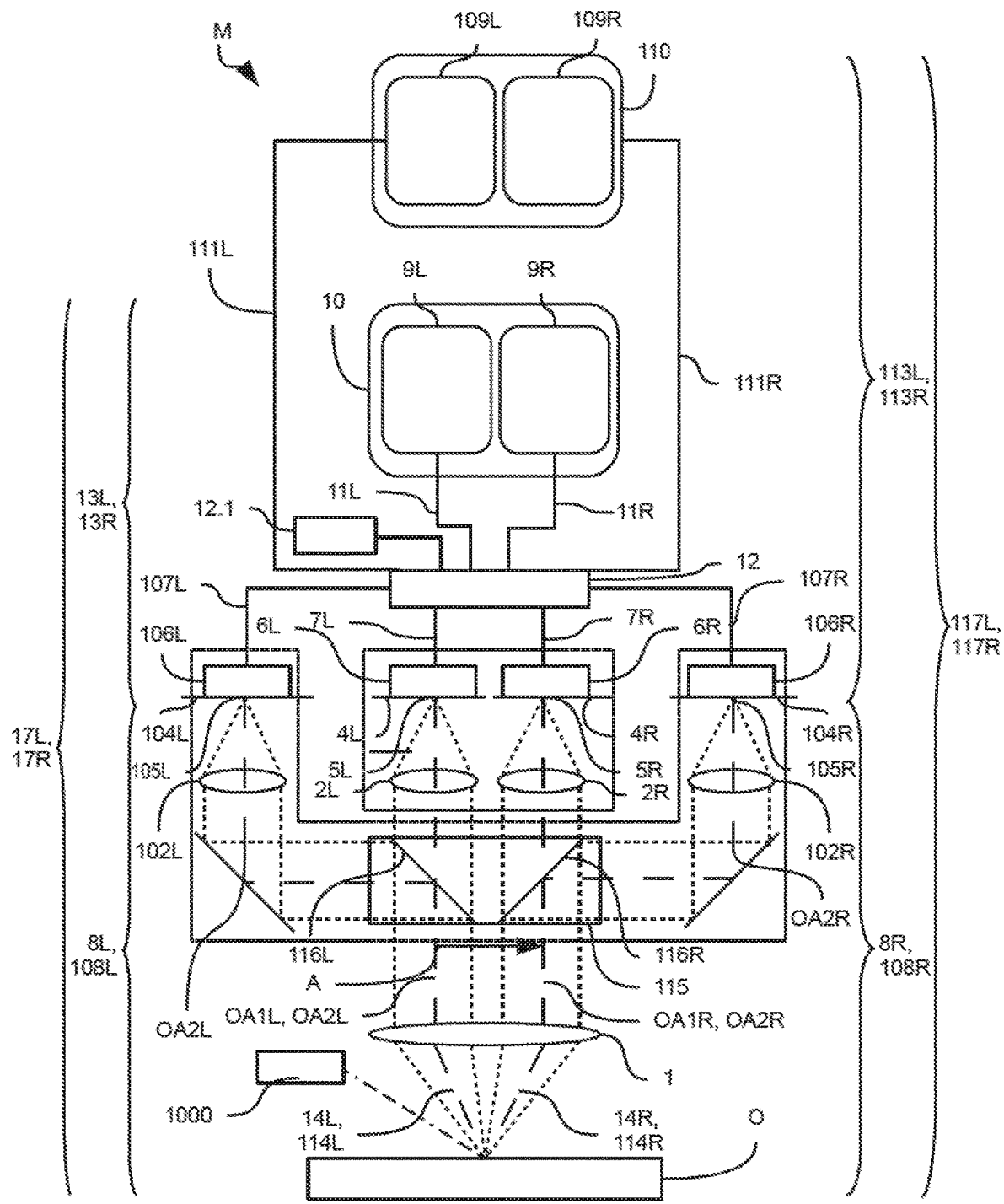
FIG. 1 shows an illustration of the basic construction of a microscope in accordance with a first exemplary embodiment.

FIG. 1 schematically shows a microscope M. The microscope M is of the telescope type and embodied to produce electronic stereo images and/or stereo videos of an object O, wherein two observers can use the microscope M at the same time, referred to below as first observer and second observer.

The elements or features of the microscope M which are assigned to the second observer have a reference sign that is greater than the reference sign of the corresponding element for the first observer by 100. Due to the stereo nature of the microscope M, the elements and features are furthermore differentiated in terms of right and left by way of a suffix "L" or "R" in the reference sign and by the corresponding adjective "left" or "right". As stated above, this is not prescriptive for the observer.

Figure 3:
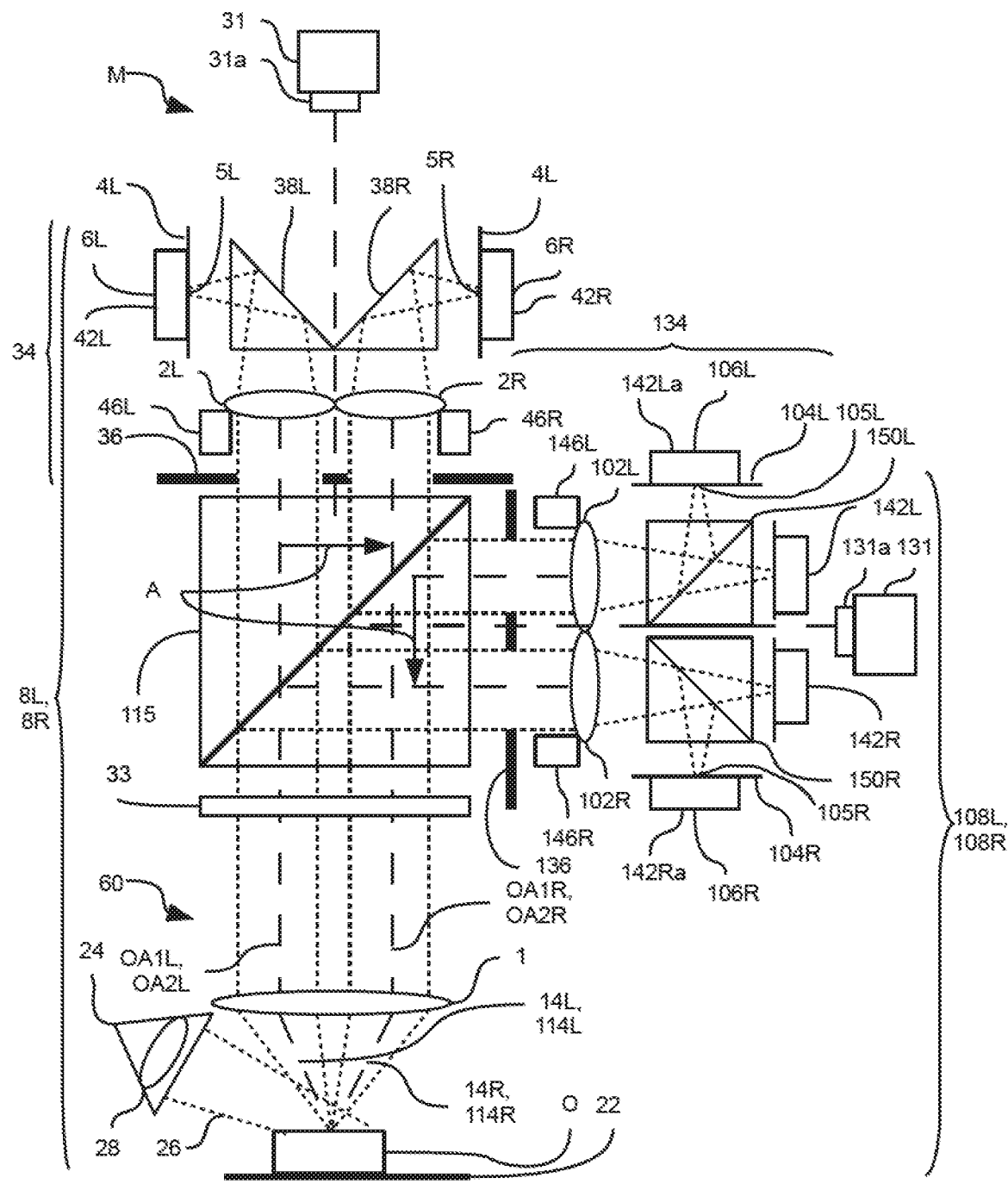
FIG. 3 shows a schematic illustration of the microscope according to a third exemplary embodiment.

The microscope M images the object O through channels which each include first optical imaging and then electronic image acquisition. In the imaging direction, the objective 1, the details of which will be described below with reference to FIG. 3, is followed by a section having parallel beam paths. First and second, in each case left and right, tube lenses 2L, 2R, 102L, and 102R generate first and second, in each case left and right, optical images 5L, 5R, 105L, and 105R in first and second, in each case left and right, image planes 4L, 4R, 104L, and 104R. Located in the image planes 4L, 4R, 104L, and 104R are first and second, in each case left and right, image detectors 6L, 6R, 106L, and 106R, which in each case convert the optical images 5L, 5R, 105L, and 105R into first and second, in each case left and right, electronic image data 7L, 7R, 107L, and 107R. The image detectors 6L, 6R, 106L, and 106R include, for example, a CCD sensor and/or a CMOS sensor. A control device 12 generates first and second, in each case left and right, electronic images 11L, 11R, 111L, and 111R, which are displayed in each case on first and second stereo display devices 10, 110, from the respective image data 7L, 7R, 107L, and 107R. The control device 12 can be for example a microprocessor, a computer having a correspondingly configured computer program, or another electric circuit. Said control device in exemplary embodiments has an input device 12.1 and, in other exemplary embodiments, additionally or alternatively, a capturing device 12.2. The stereo display devices 10 and 110 include in each case left and right display devices 9L, 9R, 109L, and 109R for the image presentation of the electronic images 11L, 11R, 111L, and 111R. The display devices 9L, 9R, 109L, and 109R can include a screen and/or a display.

The objective 1 and the tube lenses 2L, 2R, 102L, and 102R form a first and second, in each case left and right, imaging beam path 8L, 8R, 108R, and 108L, which images the object O into the image planes 4L, 4R, 104L, and 104R. The image detectors 6L, 6R, 106L, and 106R, the control device 12 and the display devices 9L, 9R, 109L, and 109R in each case form a first and second, in each case left and right, data-technological part 13L, 13R, 113L, and 113R of the microscope M.

The first imaging beam paths 8L and 8R form, together with the data-technological parts 13L and 13R, a first channel, referred to below as a first left or right subchannel 17L and 17R. Analogously, a second channel, including a second left and right subchannel 117L and 117R, is made up of the second imaging beam paths 108L and 108R and the data-technological parts 113L and 113R.

The microscope M thus includes the first left subchannel 17L, the first right subchannel 17R, the second left subchannel 117L, and the second right subchannel 117R. The first left subchannel 17L generates a first left electronic image 11L of the object O and the first right subchannel 17R generates a first right electronic image 11R of the object O. The first left electronic image 11L and the first right electronic image 11R together form a first electronic stereo image of the object O. The second left subchannel 107L generates a second left electronic image 111L of the object O, and the second right subchannel 107R generates a second right electronic image 111R of the object O. The second left electronic image 111L and the second right electronic image 111R together form a second electronic stereo image of the object O. The first electronic stereo image is displayed for the first observer on the display device 10 and the second electronic stereo image is displayed for the second observer on the display device 110.

The first left imaging beam path 8L images the object O through the objective 1 and the first left tube lens 2L into the first left optical image 5L, the first right imaging beam path 8R analogously images it into the first right optical image 5R. The first left imaging beam path 8L and the first right imaging beam path 8R form a first stereo imaging beam path for optically stereo imaging the object O.

A beam splitter device 115 is provided in the first left imaging beam path 8L and in the first right imaging beam path 8R. The second left imaging beam path 108L analogously images the object O via the beam splitter device 115 (in particular the left beam splitter 116L) and the second left tube lens 112L into the second left optical image 105L. The second right imaging beam path 108R images the object O via the beam splitter device 115 (in particular a second beam splitter 116R) and the second right tube lens 112R into the second right optical image 105R.

Figure 2:
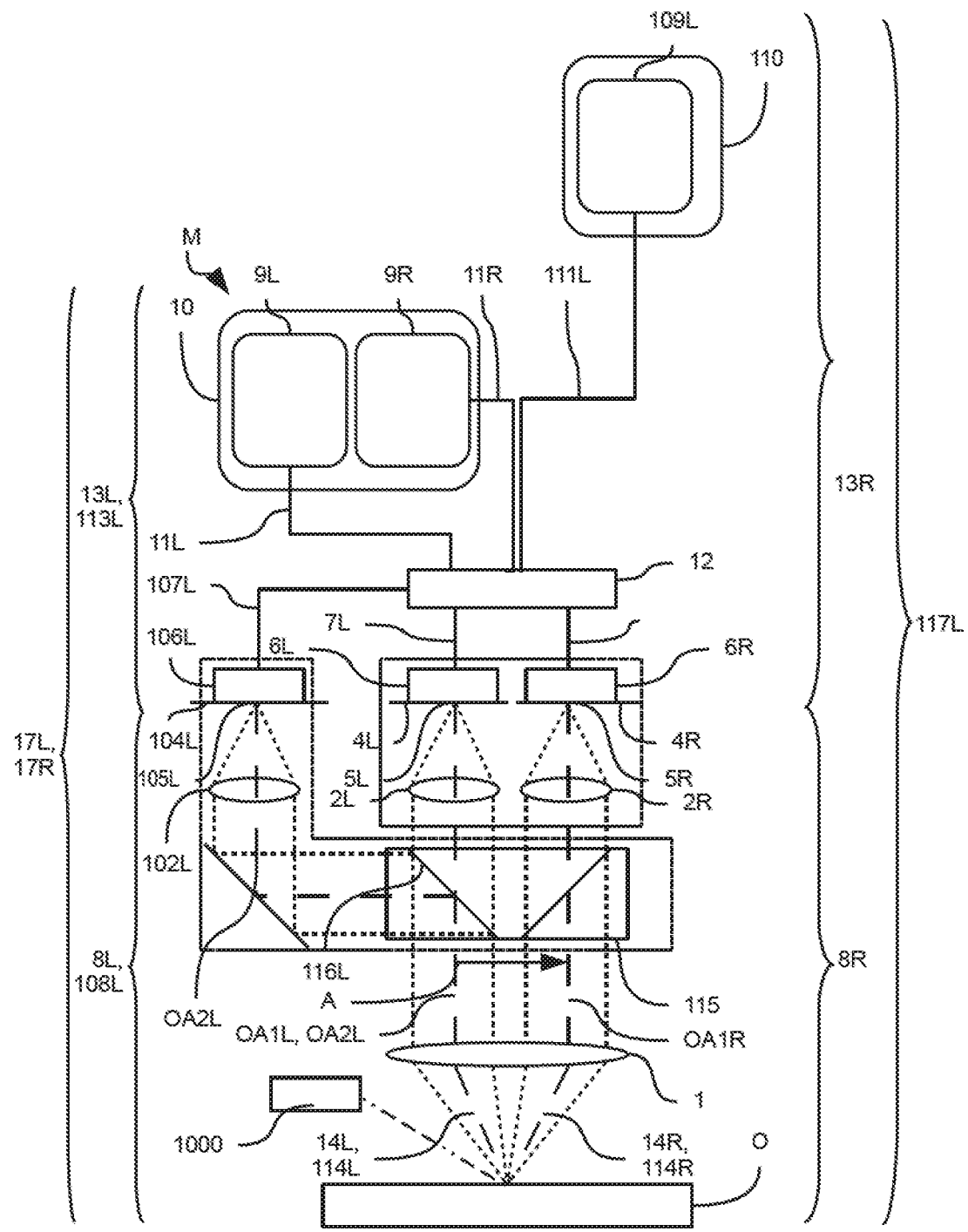
FIG. 2 shows an illustration of the basic construction of the microscope in accordance with a second exemplary embodiment.

The beam splitter device 115 can include a single beam splitter surface, as is shown for example in FIG. 3, or two separate beam splitters 116L and 116R, as is illustrated in FIGS. 1 and 2. The beam splitter device 115 deflects radiation coming from the object O into the second left subchannel 117L and into the second right subchannel 117R. The radiation for the first left subchannel 17L and in the second right subchannel 17R is transmitted by the beam splitter device 115.

Downstream of the beam splitter device 115, the radiation is focused by the tube lenses 2L, 2R, 102L, and 102R, which can include one or more lenses, into the corresponding image planes 4L, 4R, 104L, and 104R. The imaging properties of the tube lenses 2L, 2R, 102L, and 102R are optionally adjustable, and to this end have, for example, lens elements which are movable relative to one another. The objective 1 and the first tube lenses 2L and 2R or the second tube lenses 102L and 102R together form in each case an imaging optical unit. The latter images the object O into the respective image planes 4L, 4R, 104L, and 104R with a settable imaging scale. In each case, the tube lenses 2L, 2R, 102L, and 102R and/or the objective 1 can optionally each be provided with a zoom optical unit, tube lenses 2L, 2R, 102L, and 102R and/or the objective 1 are, for example, provided with two lenses which are arranged so as to be movable relative to one another, and/or additional lenses are able to be brought into the part of the imaging beam paths 8L, 8R, 108R, and 108L in which radiation travels in parallelized fashion.

The tube lenses 2L, 2R, 102L, and 102R define first and second, in each case left and right, optical axes OA1L, OA1R, OA2L, and OA2R. The first left optical axis OA1L and the first right optical axis OA1R determine a first stereo base of the first electronic stereo image in the section between the beam splitter device 115 and the objective 1, while the second left optical axis OA2L and the second right optical axis OA2R likewise define a second stereo base of the second electronic stereo image between the beam splitter device 115 and the objective 1. The left and right optical axes OA1L, OA1R and OA2L, OA2R extend between the beam splitter device 115 and the objective 1 parallel with respect to one another and define in each case an optical plane. The stereo bases are defined in each case by the absolute value and direction of a distance vector A between the left and right optical axes OA1L, OA1R and OA2L, OA2R in the region between the beam splitter device 115 and the objective 1. The distance vector A is in each case located in optical planes defined by the optical axes OA1L, OA1R and OA2L, OA2R. The length or the absolute value of the distance vector A determines the distance between the left and right optical axes OA1L, OA1R and OA2L, OA2R in the optical plane. The direction of the distance vector A determines the orientation of the optical plane and thus of the stereo base; a rotation of the stereo base results in a rotation of the optical plane.

The first left tube lens 2L, the first left image detector 6L, the first right tube lens 2R and first right image detector 6R are optionally rigid with respect to one another and in particular form a unit. However, they are rotatable with respect to the beam splitter device 115, as a result of which the orientation of the first stereo base can be changed. The second left tube lens 102L, the second left image detector 106L, the second right tube lens 102R, the second right image detector 106R and the beam splitter device 115 are optionally likewise rigid with respect to one another and form a unit. They are typically arranged so as to be fixed with respect to the objective 1, which means that the second stereo base is not changeable. The respective units in FIGS. 1 and 2 are outlined with dashes.

The first stereo base and the objective 1 determine a first left visual axis 14L for the first left subchannel 17L and a first right visual axis 14R for the first right subchannel 17R, while the second stereo base and the objective 1 define a second left visual axis 114L for the second left subchannel 117L and a second right visual axis 114R for the second right subchannel 117R.

The first left data-technological part 13L includes the first left image detector 6L, the control device 12 and optionally the first left display device 9L for the image presentation of the first left electronic image 11L. The first right data-technological part 13R includes the first right image detector 6R, the control device 12 and optionally the first right display device 9R for the image presentation of the first right electronic image 11R. The second left data-technological part 103L includes the second left image detector 106L, the control device 12 and the second left display device 109L for presenting the second left electronic image 111L, while the second right data-technological part 113R includes the second right image detector 106R, the control device 12 and the second right display device 109R for the image presentation of the second right electronic image 111R. The first left image detector 6L is located in the first left image plane 4L, the first right image detector 6R is located in the first right image plane 4R, the second left image detector 106L is located in the second left image plane 104L and the second right image detector 106R is located in the second right image plane 104R. The image detectors 6L, 6R, 106L, and 106R in each case convert the radiation of the optical images 5L, 5R, 105L, and 105R into electronic image data 7L, 7R, 107L, and 107R; in particular, the first left image detector 6L generates first left electronic image data 7L, the first right image detector 6R generates first right electronic image data 7R, the second left image detector 106L generates second left electronic image data 107L, and the second right image detector 106R generates second right electronic image data 107R.

The electronic image data 7L, 7R, 107L and 107R are transmitted to the control device 12 by way of lines. The control device 12 generates the electronic images 11L, 11R, 111L, and 111R from the electronic image data 7L, 7R, 107L, and 107R. The electronic images 11L, 11R, 111L, and 111R are in each case transmitted to the optional display devices 9L, 9R, 109L, and 109R by way of lines. The display devices 9L, 9R, 109L, and 109R represent the electronic images 11L, 11R, 111L, and 111R for the observers.

The first tube lenses 2L and 2R, and the first image detectors 6L and 6R can be held so as to be rotatable with respect to the beam splitter device 115, as is shown in FIG. 1, by way of the dashed outline. It is thus possible to rotate the first stereo base, specifically by rotating the elements mentioned. In this way, the distance vector A rotates in a plane perpendicular to the first optical axes OA1L and OA1R. When rotating the first tube lenses 2L and 2R and the first image detectors 6L and 6R, the pair of the first optical axes OA1L and OA1R typically rotate about the center thereof. In particular, the first tube lenses 2L and 2R and the first image detectors 6L and 6R have a rigid arrangement with respect to one another. Moreover it is possible for the first tube lenses 2L and 2R and the first image detectors 6L and 6R to be arranged so as to be movable relative to one another, with the result that for example the length of the distance vector can be changed. The second tube lenses 102L and 102R and the second image detectors 106L and 106R are arranged rigidly with respect to the beam splitter device 115, as is shown in FIG. 1 by way of the dashed outline.

With regard to the first left subchannel 17L and the first right subchannel 17R, the microscope M in accordance with FIG. 2 corresponds to the microscope M of the exemplary embodiment shown in FIG. 1. The second channel 117L also corresponds to the second left subchannel 117L of the microscope M in accordance with the exemplary embodiment shown in FIG. 1. However, the second subchannel 117R is missing entirely. Consequently, the microscope M is suitable for displaying the first electronic stereo image and a second monoscopic electronic image of the object O. The remaining second channel 117L is therefore a monoscopic channel by way of which a monoscopic electronic image of the object O can be acquired and presented using the display device 110.

The microscope M shown in FIG. 3 is embodied in the form of a stereo microscope of the telescope type, wherein FIG. 3 illustrates details of the first left imaging beam path 8L, of the first right imaging beam path 8R, of the second left imaging beam path 108L, of the second right imaging beam path 108R, and also of the image detectors 6L, 6R, 106L, and 106R. The display devices and the control device 12 are not illustrated in FIGS. 2 and 3, but can be embodied in each case as in FIG. 1. The microscope M is a digital surgical stereo microscope with which electronic stereo images and/or stereo videos of an object O can be captured. To this end, the object O is placed on an operating field 22 and illuminated using an illumination device 24. The illumination device 24 transmits as illumination radiation 26 white light, that is to say radiation having wavelengths in the visible range, and optionally radiation for exciting fluorescence in the object O.

The control device 12 is connected to the illumination device 24 via radio or by way of data-technological lines (not illustrated in the figures) and can in particular vary the intensity of the emitted light, the duration of an illumination pulse, and the size of an illuminated surface on the object O, the illumination surface. This is accomplished for example using an illumination objective 28, which is assigned to the illumination device 24 and which is controllable. The intensity of the illumination, the duration of an illumination pulse, and the size of the illumination surface are set in dependence on the application.

The control device 12 can also control the illumination device 24 in a manner such that the illumination device 24 emits light pulses which are synchronized with the exposure time of the first left image detector 6L, of the first right image detector 6R, of the second left image detector 106L, and/or of the second right image detector 106R. The control device 12 can optionally control the illumination device 24 to emit light pulses which differ in terms of their spectral characteristic. A first pulse can include white light and can be synchronized with the exposure of the first of the image detectors 6L and 6R, while a second exposure pulse emits light for exciting fluorescent dyes, wherein the second light pulse is synchronized with the exposure of the second image detectors 106L and 106R. In this way, the illumination can be optimized for the image detectors 6L, 6R, 106L, and 106R.

Moreover, the control device 12 can expose the first left image detector 6L and the first right image detector 6R and also the second left image detector 106L and the second right image detector 106R with a time offset, such that a video signal with double the frame rate can be produced, possibly without reducing the exposure duration. It is furthermore optionally possible for the exposure duration to be increased, for example doubled, and for a video signal with the same frame rate to be produced; in this way, the signal-to-noise ratio can be increased at the same frame rate.

The fluorescent dye excited by the illumination radiation having a corresponding wavelength can be, for example, indocyanine green (ICG), having an absorption spectrum of mainly between 600 nanometers (nm) and 900 nm and emitting radiation having wavelengths between 750 nm and 950 nm. Moreover, protoporphyrin IX (PpIX) can also be used as a fluorescent dye having an absorption spectrum of between 400 and 500 nm and an emission spectrum of between 600 and 670 nm.

The imaging beam paths 8L, 8R, 108L, and 108R include an optional filter 33. After the rays have travelled through the objective 1 or the varioscope, rays coming from a point of the object O are parallel with respect to one another. The filter 33 is able to be optionally brought into the beam paths, for example using an electric motor controlled by the control device 12. The filter 33 for example blocks radiation having undesirable wavelengths.

Subsequently, the radiation, coming from the object O, of the common beam path is guided into the beam splitter device 115, which in this exemplary embodiment includes a dichroic beam splitter. The beam splitter device 115 splits the radiation into the first left imaging beam path 8L and the first right imaging beam path 8R and also into the second left imaging beam path 108L and the second right imaging beam path 108R. 50% of the radiation in the visible wavelength range, which is an example of the first wavelength range, is reflected, for example, and 50% is transmitted. Typically, 100% of radiation having wavelengths of greater than 800 nm, which is an example of a second wavelength range, is reflected and 0% is transmitted. If the fluorescent dye ICG is excited in the object O, the fluorescence radiation is nearly completely reflected at the beam splitter device 115. The reflected radiation is guided to the second image detectors 106L and 106R, and the transmitted radiation is guided to the first image detectors 6L and 6R. Downstream of the beam splitter device 115, the first left imaging beam path 8L and the first right imaging beam path 8R consequently only guide light in the visible wavelength range, while the second left imaging beam path 108L and the second right imaging beam path 108R include radiation in the visible wavelength range and in the infrared wavelength range.

A first stereo camera 34 includes a first pupil stop 36 provided with a double hole, the first left tube lens 2L, the first right tube lens 2R, two first deflection prisms 38L and 38R, the first left image detector 6L and the second left image detector 6R. The first left image detector 6L is embodied as a single first left image sensor 42L and the first right image detector 6R is embodied as a single first right image sensor 42R. The first left tube lens 2L defines the first left optical axis OA1L and the first right tube lens 2R defines the first right optical axis OA1R. A rotation of the first stereo base thus results in a rotation of the distance vector A in a plane perpendicular to the first optical axes OA1L and OA1R and consequently in a rotation of the pair of the first optical axes OA1L and OA1R about itself. In the exemplary embodiment illustrated in FIG. 3, all elements of the first stereo camera 34 can be rotated together, in particular relative to the beam splitter device 115.

The radiation transmitted by the beam splitter device 115 is guided through the two openings in the first pupil stop 36 and imaged through the first tube lenses 2L and 2R of the first stereo camera 34 onto the first image sensors 42L and 42R. They can be embodied in the form of color sensors, for example for detecting visible light. The color sensors in particular include a chip with a Bayer pattern thereon or three monochrome sensors for detecting light in specific wavelength ranges with a color splitter prism thereon. The first pupil stop 36 delimits the extent of the radiation in the first left and the first right imaging beam paths 8L and 8R. First drives 46L and 46R adjust the imaging scale.

Furthermore, the size of the first pupil stop 36 for the radiation of the first imaging beam paths 8L and 8R can be adjustable independently; the first imaging beam paths 8L and 8R can thus include in each case a stop of a different size. The first pupil stop 36 is typically adjustable continuously or incrementally for each of the first imaging beam paths 8L and 8R. It is also possible for the first pupil stop 36 to be adjustable only for the first left imaging beam path 8L or for the first right imaging beam path 8R.

Optionally, first left and right deflection prisms 38L and 38R are provided, which deflect the radiation coming from the first tube lenses 2L and 2R onto the first image sensors 42L and 42R. The first image sensors 42L and 42R in each case include a detector surface having a plurality of pixels, which can convert the incident radiation into the first electronic image data 7L and 7R. The generated first electronic image data 7L and 7R are passed on to the control device 12. The first left image sensor 42L defines the first left image plane 4L, wherein the first left optical image 5L is imaged onto the first left image sensor 42L. Analogously, the first right image sensor 42R defines the first right image plane 4R, wherein the first right optical image 5R is imaged onto the first right image sensor 42R.

The first stereo camera 34 furthermore includes a first rotary motor 31 and a first angle detector 31a. The stereo base of the first stereo camera 34 is rotatable about the main axis of the objective 1 by way of the first rotary motor 31. In this way, the first left optical axis OA1L and the first optical axis OA1R rotate about a main axis of the objective 1, and the stereo base of the first stereo camera 34 can be changed relative to the object O. The rotary motor 31 is provided with the first angle detector 31a, which ultimately measures the position of the first stereo base. The first angle detector 31a and the first rotary motor 31 are data-technologically connected to the control device 12 by lines (not illustrated) or by radio. The control device 12 controls the first rotary motor 31, which rotates in particular the first stereo camera 34 about the main axis of the objective 1.

A second stereo camera 134 includes a second pupil stop 136 provided with a double hole, the second left tube lens 102L, the second right tube lens 102R, a second left camera beam splitter 150L, and a second right camera beam splitter 150R, and also the second left image detector 106L, and the second right image detector 106R. The second left optical axis OA2L and second right optical axis OA2R, respectively defined by the second pupil stop 136 and the right tube lenses 102L and 102R, extend in a section between the objective 1 and the beam splitter device 115 parallel to the main axis of the objective 1. A rotation of the second stereo base results in a rotation of the distance vector A in a plane perpendicular to the second optical axes OA2L and OA2R, and consequently in a rotation of the pair of the second optical axes OA2L and OA2R about itself. In the exemplary embodiment illustrated in FIG. 3, all elements of the second stereo camera 134 can be rotated together, in particular relative to the beam splitter device 115.

The radiation reflected by the beam splitter device 115 is guided through the openings in the second pupil stop 136 and imaged through the second tube lenses 102L and 102R of the second stereo camera 134 onto the second image sensors 106L and 106R. The second pupil stop 136 delimits the extent of the radiation of the second left imaging beam path 108L and of the second right imaging beam path 108R. The second tube lenses 102L and 102R can, together with the objective 1, change the imaging scale of the imaging of the object O onto the second image detectors 106L and 106R via second drives 146L, 146R.

Furthermore, the size of the second pupil stop 136 for each of the second imaging beam paths 108L and 108R is adjustable independently; each second imaging beam path 108L and 108R can thus include a stop of a different size. The second pupil stop 136 is typically adjustable continuously or incrementally for each of the second imaging beam paths 108L and 108R. It is also possible for the second pupil stop 136 to be adjustable only for the second left imaging beam path 108L or for the second right imaging beam path 108R.

The second image detectors 106L and 106R include four second image sensors 142L, 142La, 142R, and 142Ra configured to convert incident radiation into second electronic image data 107L and 107R. The second left image detector 106L includes a second left primary image sensor 142L and a second left secondary image sensor 142La, the second right image detector 106R includes a second right primary image sensor 142R and a second right secondary image sensor 142Ra. The second primary image sensors 142L and 142R detect, for example, visible light and can be embodied in the form of the above-described color sensors. The second secondary image sensors 142La and 142Ra are provided, for example, for detecting infrared radiation and embodied in the form of monochrome sensors for detecting light of a specified wavelength range. The second camera beam splitters 150L and 150R have a transmission/reflection spectrum by which radiation in the infrared wavelength range is directed onto the second secondary image sensors 142La, 142Ra, while radiation in the visible range is transmitted onto the second primary image sensors 142L and 142R. The second image sensors 142L, 142La, 142R, and 142Ra are connected to the control device 12. The second left image sensors 142L and 142La in each case define the second left image plane 104L, wherein the second left optical image 105L is imaged onto the second left image sensors 142L and 142La. Analogously, the second right image sensors 142R and 142Ra in each case define the second right image plane 104R, wherein the second right optical image 105R is imaged onto the second right image sensors 142R and 142Ra. The image sensors 42L, 42R, 142L, and 142Ra can each be embodied as a CCD sensor and/or a CMOS sensor.

The second stereo camera 134 optionally includes a second rotary motor 131 and a second angle detector 131a. The second optical axes OA2L and OA2R are rotatable in the section between the objective 1 and the beam splitter device 115 about the main axis of the objective 1 using the second rotary motor 131; it is thus possible to change the angular position, that is to say the second stereo base, of the second stereo camera 134 relative to the object O. The second angle detector 131a, which ultimately measures the second stereo base, is assigned to the second rotary motor 131. The second rotary motor 131 and the second angle detector 131a are data-technologically connected to the control device 12 by lines (not illustrated) or by radio. The control device 12 can control the second rotary motor 131, which rotates the second stereo camera 134.

The control device 12 can typically adjust the exposure time and the resolution of the first stereo camera 34 and of the second stereo camera 134.

The size of the pupil stops 36 and 136 is settable individually for each imaging beam path; each imaging beam path 8L, 8R, 108L, and 108R can consequently have a stop of different size. The first pupil stop 36 is typically adjustable continuously, but at least incrementally. It is also possible for only the first pupil stop 36 to be adjustable.

Figure 4:
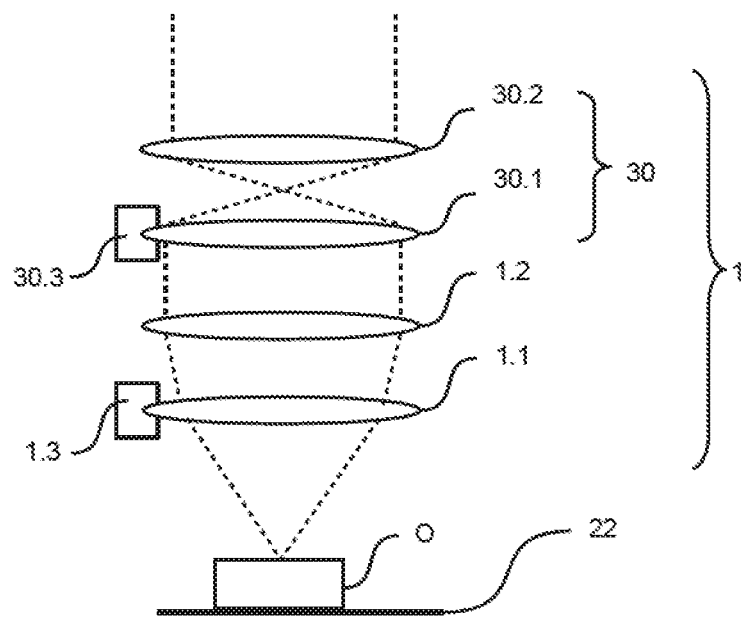
FIG. 4 shows a schematic illustration of details of an objective of the microscope of FIGS. 1 to 3.

As is illustrated in FIG. 4, the objective 1 is embodied in multiple parts and includes for example a varioscope 30, here realized by way of a movable lens element 30.1 and a fixed lens element 30.2. The movable lens element 30.1 is adjustable, with actuation by the control device 12, by a drive 30.3. The objective 1 furthermore includes a movable element 1.1 and a fixed element 1.2. The movable element 1.1 is adjustable by a drive 1.3, again with actuation by the control device. In this way, a zoom optical unit is realized, with which the imaging scale and the focal plane can be set during the imaging of the object O. In this way, the object O can be imaged with adjustable magnification or imaging scale in the stereo microscope M, wherein at the same time the position of the focal plane can be set, that is to say focused at different depth layers. Since the object O, as will be explained below, includes a depth structure in the use of the microscope M, this characteristic is of special importance. FIG. 4 shows, purely by way of example, a continuous adjustability of the imaging scale. Similarly, it is also possible to realize incremental adjustment by way of pivotable elements.

The function of the microscope M and the operation that is effected by the control device 12 are as follows:

The radiation coming from the object O is split by the beam splitter device 115. Here, for example 50% of the light in the visible range is transmitted, with the result that, in total, 50% of the intensity of the radiation in the visible wavelength range is guided to the first left image detector 6L and the first right image detector 6R to produce the first left electronic image data 7L and the first right electronic image data 7R. Since the beam splitter device 115 reflects the radiation in the infrared wavelength range, the first electronic images 11L and 11R, produced by the first left subchannel 17L and the first right subchannel 17R, substantially capture radiation in the visible range. Information in the infrared wavelength range is not captured by the first left subchannel 17L and the first right subchannel 17R in the illustrated exemplary embodiment of the microscope M.

Approximately 50% of the intensity of the radiation coming from the object O in the visible wavelength range is guided to the second left image detector 106L and the second right image detector 106R to capture the second left electronic image 111L and the second right electronic image 111R, while approximately 100% of the radiation in the infrared wavelength range is directed onto the second image detectors 106L and 106R. The second stereo camera 134 can thus generate second electronic image data 107L and 107R of the object O in the visible range and an infrared, for example fluorescence image of the object O, if for example the fluorescent dye ICG or another dye is present in the object O. Due to the fact that approximately the entire infrared radiation can be guided onto the second stereo camera 134, it is possible, even though the intensity of the fluorescence radiation is typically low, to capture a fluorescence image with a good signal-to-noise ratio. The first electronic image data 7L and 7R captured by the first stereo camera 34 and the second electronic image data 107L and 107R captured by the second stereo camera 134 are passed on to the control device 12, which initially generates the second electronic images 111L and 111R of the visible wavelength range and of the infrared wavelength range, and then superposes them. This second total stereo image can be presented to the second observer by way of the stereo display device 110.

When performing examinations using the microscope M, the control device 12 performs a method for setting a depth-of-field region TB. This method can be performed individually for each left or second channel of the first or second imaging beam path, alternatively for both channels and/or both observers.

Figure 5:
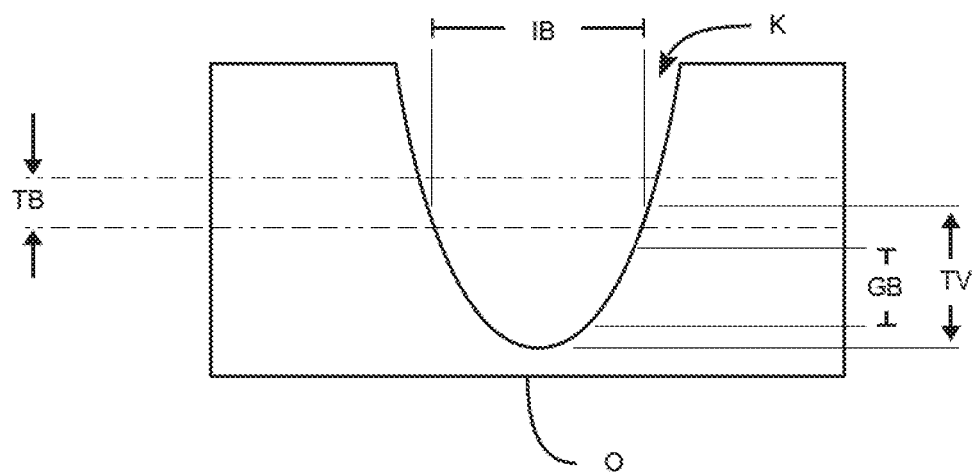
FIG. 5 shows a schematic illustration of an object for illustrating the setting of a depth-of-field region.

The object O has a depth extent. FIG. 5 shows by way of example the object O with a channel K, which extends along the optical axis of the imaging. Further shown in the figure is a depth-of-field region TB, which is produced at a given setting of the microscope M, in particular at a given aperture and a given focal length of the imaging. The depth-of-field region TB is located symmetrically with respect to a focal plane of the imaging. The object O should be captured in a region of interest IB and examined using the microscope. Said region of interest IB is illustrated in exemplary fashion in FIG. 5 and captures for example the bottom region of the channel K. The region of interest IB can, however, also be such that it covers the entire opening of the channel K or even lateral regions outside the channel K. The object O has a depth distribution TV in the region of interest IB. In the setting of the microscope shown in FIG. 5, the depth-of-field region TB overlaps with the depth distribution TV in the region of interest IB only to a small extent. Furthermore, the axial extent of the depth-of-field region TB is smaller than that of the depth distribution TV in the region of interest IB. Consequently, a pure displacement of the focal plane and an associated displacement of the depth-of-field region TB would not result in capturing of the depth distribution TV in the region of interest IB. The control device 12 therefore performs a method which makes it possible for the object O to be continuously imaged sharply in the region of interest. To this end, the region of interest IB is first defined. This can be effected for example by way of an automatic evaluation of the object O. In other exemplary embodiments, information relating to the object O that indicates a region of interest IB is already previously known. This can be the case, for example, when checking a series product for mechanical deviations. Similarly, it may be previously known during an operation which anatomic structure is to be examined under the microscope, such that the region of interest IB can be derived therefrom. In such exemplary embodiments, the region of interest IB on the object O is thus previously known by the control device 15, for example provided in a storage module, or is ascertained thereby. In other exemplary embodiments, the observer indicates the region of interest IB. The control device 12 in these exemplary embodiments includes the input device 12.1 for defining the region of interest IB.

Next, the control device 12 ascertains the depth distribution TV in the region of interest IB. This can be implemented by an image evaluation. In an exemplary embodiment, the control device 12 performs a depth scan on the microscope M to ascertain the depth distribution of the object O in the region of interest IB. In another exemplary embodiment, the microscope M includes a depth sensor 1000, as is illustrated for example in FIGS. 1 and 2. This can be a time-of-flight sensor, as is available for example by TriDiCam GmbH, Duisburg, Germany.

Once the depth distribution TV has been ascertained in terms of extent and axial position, the control device 12 adjusts the focal plane such that it is located centrally in the depth distribution TV. The control device 12 furthermore adjusts an imaging parameter such that the depth-of-field region TB also has the same extent as the depth distribution TV. For this purpose, the control device 12 automatically ascertains a parameter which can be adjusted as part of the microscopy to be performed and influences the extent of the depth-of-field region TB. Various parameters have been explained in the general part of the description. A known parameter is the use of a stop in a pupil plane of the imaging beam path. The control device 12 compensates the changed light intensity, which is established by adjusting the stop (when stopping down, the light intensity available for image recording decreases, when stopping up, it increases), by way of a counteracting adjustment of the light intensity available for the imaging. This can involve a manipulation of an illumination source, for example the light source 24 in FIG. 3, the change of an integration time in an electronic detector, pixel binning etc. The various possibilities have already been presented in the general part of the description.

In a further exemplary embodiment, the control device 15 defines within the ascertained depth distribution a desired depth region GB, which is limited with respect to the former, and the control device 15 adjusts the at least one imaging parameter such that the depth-of-field region TB corresponds to the desired depth region GB. The definition of the desired depth region GB can be determined by predetermined algorithms, for example a limitation to a specific percentage of the depth distribution, a limitation of the depth distribution to a maximum extent, an axial reference location at the lower edge or upper edge of the depth distribution, for example the upper edge of the channel K, etc., can be stored in the controller 15. A change between different approaches can be effected by way of mode-selection switching at the controller 15, which is either automatic in dependence on the application or is initiated by a user manipulation. It is also possible that the user indicates the desired depth region GB by way of the input device of the control device 12.

It has been explained above that the control device 12 sets the depth-of-field region TB to the desired depth region GB or the depth distribution TV. According to an aspect of the disclosure, no 100% match is required; rather, a tolerance range can be defined, within which the match is to be attained. The permissible deviation can be, for example, 5%, 10%, or 20%.

According to another aspect of the disclosure, the control device 12 initially offers a temporary image to the observer, which was produced for example by way of the setting in accordance with FIG. 5. In this image, the observer can then indicate the region of interest IB, which is ultimately to be captured by the depth-of-field region TB.

In an exemplary embodiment, the desired depth region GB corresponds to the depth distribution TV.

According to another exemplary embodiment, the control device 12 includes a capturing device 12.2. The capturing device 12.2 is shown by way of example in the setup of FIG. 1, but it is possible to also include the capturing device 12.2 in other exemplary embodiments. The capturing device ascertains the location of the display device 10 and 110 at which the observer aims his or her gaze. The control device 12 then ascertains the region of interest IB from said location indication. The capturing device 12.2 can include, for example, a camera which is attached to the display device 10 and/or 110 and with whose data the control device 12 captures the location. The capturing device can thus also in part be embodied as a software module operating in the control device 12.

It is understood that the foregoing description is that of the exemplary embodiments of the disclosure and that various changes and modifications may be made thereto without departing from the spirit and scope of the disclosure as defined in the appended claims.

What is claimed is:

1. A microscopy method for imaging an object, the method comprising:
   imaging the object into an optical image on an image detector;
   generating electronic image data from the optical image with the image detector;
   generating an electronic image from the electronic image data;
   defining a region of interest in the electronic image;
   determining a depth distribution in the region of interest and/or in a region of the object that corresponds to the region of interest;
   determining a desired depth region in the depth distribution;
   selecting at least one imaging parameter with which a size of a depth-of-field region can be changed; and
   setting the depth-of-field region of the electronic image by changing the at least one imaging parameter to permit the depth-of-field region to cover the desired depth region or to cover a specific portion thereof.

2. The microscopy method according to claim 1, wherein the desired depth region is determined based on the region of interest.

3. The microscopy method according to claim 1, further comprising:
   imaging the object onto the image detector with an adjustable imaging scale, wherein the at least one imaging parameter is an optical imaging scale;
   reducing the optical imaging scale to set the depth-of-field region; and
   digitally post-enlarging the electronic image for compensation.

4. The microscopy method according to claim 1, further comprising:
   imaging the object onto the image detector with a stop having an adjustable aperture size, wherein the at least one imaging parameter is the adjustable aperture size; and
   changing the adjustable aperture size to set the depth-of-field region.

5. The microscopy method according to claim 4, further comprising:
   changing a quantity of light during the imaging of the object onto the optical image and/or during the generating of the electronic image data to compensate the changing of the adjustable aperture size.

6. The microscopy method according to claim 3, wherein:
   a focal length of the imaging is adjustable, and
   the depth-of-field region is centered onto the desired depth region by changing the focal length.

7. The microscopy method according to claim 1, further comprising:
   determining the depth distribution in the object using a depth distribution sensor.

8. The microscopy method according to claim 1, further comprising:
   generating an electronic stereo image of the object, the electronic stereo image including two partial images.

9. The microscopy method according to claim 8, further comprising:
   applying the microscopy method to only one of the two partial images.

10. The microscopy method according to claim 8, further comprising:
    calculating the depth distribution from one of the two partial images.

11. The microscopy method according to claim 1, further comprising:
    displaying the electronic image on a display device,
    capturing a location on the display device at which an observer aims his or her gaze during a specified time interval with a capturing device included in a control device, and
    wherein the control device is configured to define the region of interest based on the location.

12. A microscope for capturing an electronic image of an object, the microscope comprising:
    an image detector configured to generate electronic image data from an optical image;
    an imaging optics configured to image the object into the optical image on the image detector, and
    a control device having an input device and being configured to:
      generate an electronic image of the object from the electronic image data,
      select a region of interest in the electronic image with the input device,
      determine a depth distribution in a region of interest and/or in a region of the object corresponding to the region of interest,
      determine a desired depth region in the depth distribution with the input device,
      select at least one imaging parameter to change a size of a depth-of-field region, and
      set the depth-of-field region by changing the at least one selected imaging parameter to permit the depth-of-field region to coincide with the desired depth region.

13. The microscope according to claim 12, wherein the control device is configured to:

image the object into an optical image on an image detector;
generate electronic image data from the optical image with the image detector;
generate an electronic image from the electronic image data;
define a region of interest in the electronic image;
determine a depth distribution in the region of interest and/or in a region of the object that corresponds to the region of interest;
determine a desired depth region in the depth distribution,
select at least one imaging parameter with which a size of a depth-of-field region can be changed, and
set the depth-of-field region of the electronic image by changing the at least one selected imaging parameter to permit the depth-of-field region to cover the desired depth region or to cover a specific portion thereof.

* * * * *